United States Patent [19]

Okada et al.

[11] 4,102,786
[45] Jul. 25, 1978

[54] METHOD FOR CLEANING OF FILTER DEVICE

[75] Inventors: Hiroo Okada, Sagamihara; Moriyuki Hirota, Yamato; Masaaki Uesugi, Yokohama, all of Japan

[73] Assignee: Kurita Water Industries Limited, Osaka, Japan

[21] Appl. No.: 762,280

[22] Filed: Jan. 25, 1977

[30] Foreign Application Priority Data

Jan. 26, 1976 [JP] Japan .................................... 51-6607

[51] Int. Cl.² ............................................. B01D 23/24
[52] U.S. Cl. ......................................... 210/80; 210/82; 210/275; 210/290
[58] Field of Search ................................. 210/80–82, 210/269, 270, 275, 290

[56] References Cited

U.S. PATENT DOCUMENTS

| | | | |
|---|---|---|---|
| 3,550,774 | 12/1970 | Hirs et al. | 210/80 X |
| 3,695,433 | 10/1972 | Hirs et al. | 210/80 X |
| 3,814,245 | 6/1974 | Hirs | 210/82 X |
| 3,814,247 | 6/1974 | Hirs | 210/82 X |
| 3,900,395 | 8/1975 | Hirs | 210/82 X |
| 3,932,278 | 1/1976 | Meidl et al. | 210/82 X |
| 3,953,333 | 4/1976 | Hirs | 210/82 X |
| 4,048,068 | 9/1977 | Hirs | 210/80 |

*Primary Examiner*—William A. Cuchlinski, Jr.
*Attorney, Agent, or Firm*—Oblon, Fisher, Spivak, McClelland & Maier

[57] ABSTRACT

Disclosed herein is a method for cleaning a filter device packed with a bed of filtering grains, which cleaning is effected whenever the pressure loss in the filter device has increased to a prescribed level by first discharging the filtering grains through the upper side of the device in conjunction with a current of water, then circulating the filtering grains back into the device via the lower side thereof and giving the freshly formed bed of filtering grains a backwashing with water.

6 Claims, 3 Drawing Figures

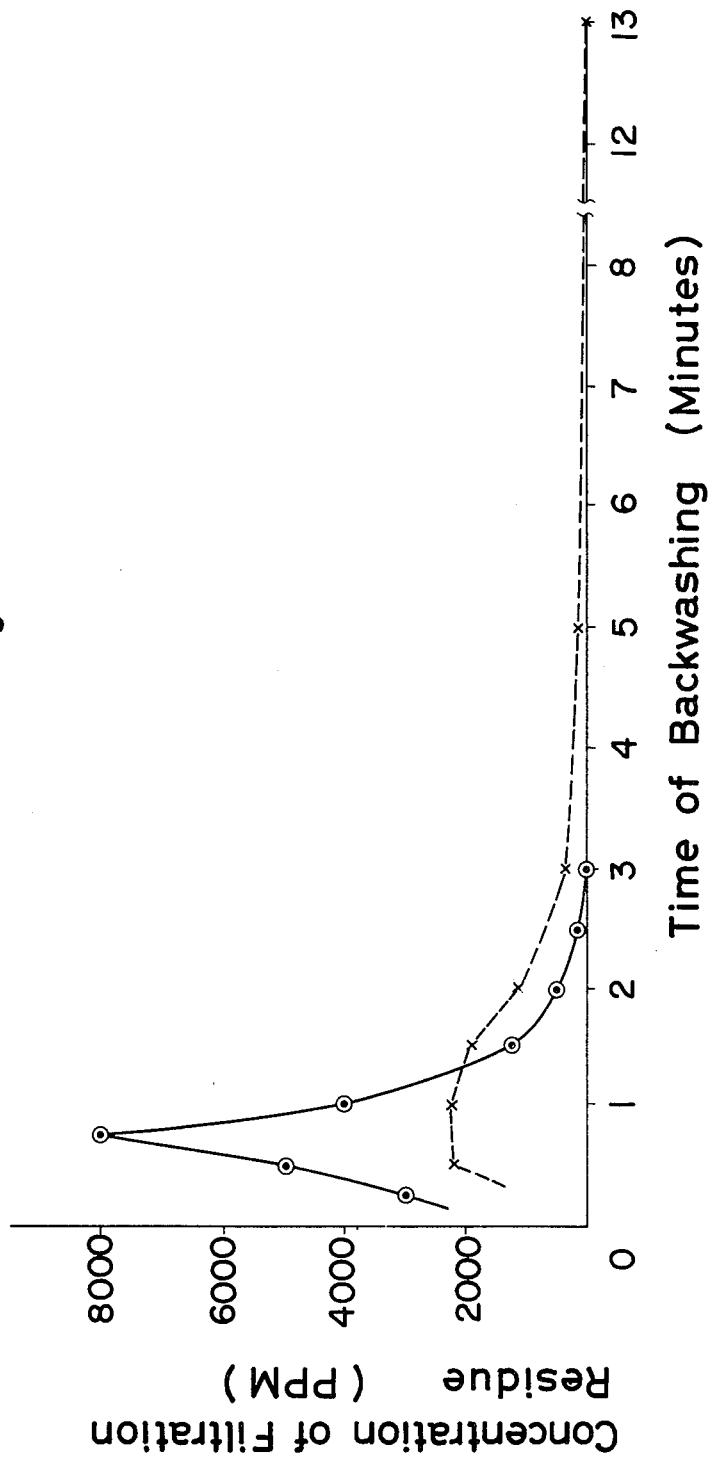

METHOD FOR CLEANING OF FILTER DEVICE

BACKGROUND OF THE INVENTION

1. Field of the Invention

This invention relates to a method for the washing of filtering grains which form a filter bed in a filter device.

2. Description of the Prior Art

Generally filter devices are used for the purpose of purifying industrial effluents from iron and steel works and paper and pulp mills and secondarily treated water from sewage works (hereinafter referred to collectively as "raw water"), for example. In these filter devices there are disposed filter beds formed of granular filtering materials such as sand. As the raw water is introduced into the filter device through the upper side thereof and passed through the bed of such filtering grains, water-insoluble solids, oil droplets, etc., suspended in the raw water are retained as the filtration residue and the purified water is released via the lower side of the filter device. During the process of this water purification, part of the filtration residue at times, if not always, forms spheres called "mud balls," which may possibly be retained within the filter bed.

The operation of raw water purification or the operation of filtration is carried out continuously. However, when the amount of said filtration residue increases in the course of continued filtration, the pressure loss occurring in the bed of filtering grains gradually increases to the extent of degrading the efficiency of purification. In this case, the bed of filtering grains is washed by a method described below so as to free it from the filtration residue. The washing is effected by blowing compressed air into the filter device through the lower side thereof to agitate the filter bed vigorously and scrape the deposited filtration residue frictionally off the filtering grains and subsequently giving the filter bed a backwashing with water by causing an upward current of cleansing water to flow through the bed via the lower side of the device. The backwashing loosens the filter bed and fluidizes its individual grains, causing the filtration residue to float up in conjunction with the ascending water and depart from the device. Some filtration residue adheres so fast to the filtering grains that the separation of the adhering filtration residue from the filtering grains requires blowing of compressed air. Mud balls are formed by conglomeration of oily components and suspended solids and they often survive the washing and persist within the filter bed. As the filtration is resumed through the washed filter bed, these mud balls gain in size and, occasionally, break into fine segments and leak into the purified water.

As described above, the washing method known to the art requires the combination of two operations, blowing of compressed air and backwashing with water. For this method, therefore, use of an air compressor and an accumulator is found indispensable.

Since the washing such as is described above fails to provide thorough removal of these mud balls, it often becomes necessary to stop the operation of the filter device and give the filtering grains a washing with water. This interruption has prevented the filter device from being operated continuously at a high efficiency.

SUMMARY OF THE INVENTION

A primary object of the present invention is to provide a method for the washing of a filter bed in a filter device, which method permits the filter bed to be washed thoroughly at an extremely high efficiency without reference to the kind of substance which is retained in the filter bed. Another object of this invention is to provide a method for the washing of a filter bed, which effects desired washing without requiring use of an air compressor or an accumulator.

To accomplish the objects described above according to the present invention, there is provided an improved method for the washing of a filter device, which method comprises a first step of introducing water upwardly into the filter device from the lower side of the filter bed for thereby causing the upward current of water to entrain at least part of the filtering grains, permitting the upward current of water and the entrained filtering grains to depart from the device through the upper side thereof, leading the current of water entraining the filtering grains back into the device via the lower side of the filter bed and an ensuing second step of passing a current of rinsing water to ascend through the filter bed upwardly from the lower side of said bed.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 3 is a graph comparing the method of the present invention and the conventional method with respect to the time-course change of the amount of the filtration residue entrained by the backwash water.

DETAILED DESCRIPTION OF THE INVENTION

While the conventional method for the washing of a filter device has necessitated two combined operations, i.e., introduction of compressed air and feeding of backwash water, the method provided for the same purpose by the present invention obviates the necessity for the introduction of compressed air. Consequently, this invention requires neither an air compressor nor an accumulator and permits a reduction in the time required for the washing operation and a reduction also in the volume of rinse water for backwashing. Even if mud balls are present in the filter bed, the method of the present invention is capable of thoroughly removing this otherwise troublesome kind of filtration residue.

Now, the present invention will be described by comparing the method thereof with the conventional method with reference to the accompanying drawing.

Figure 1:
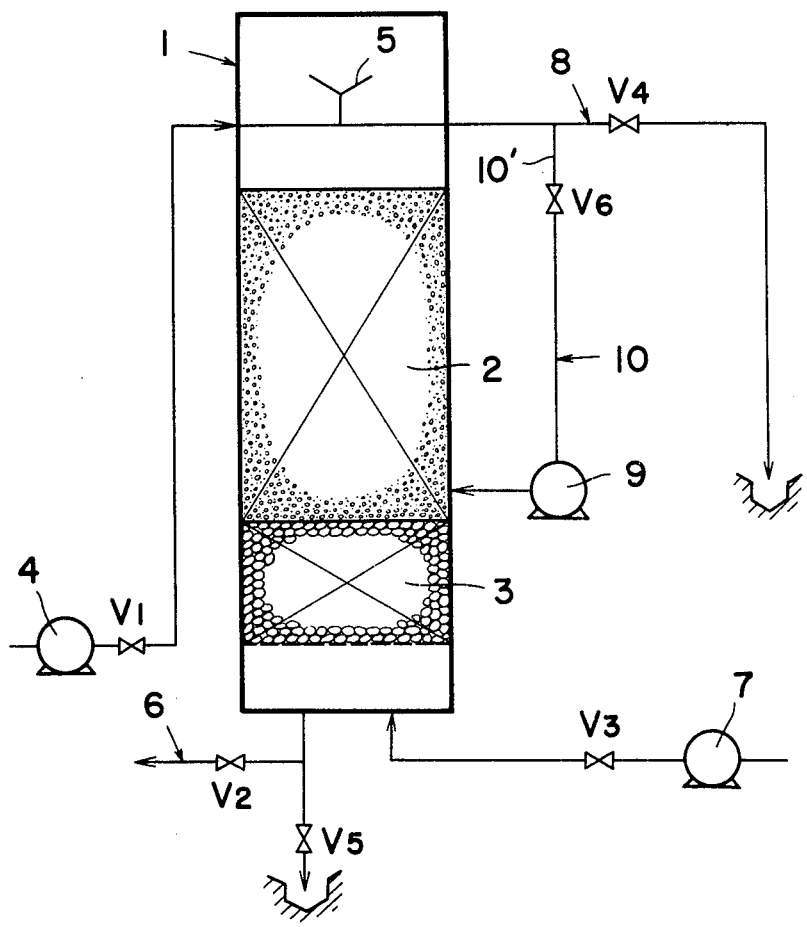
FIG. 1 is a flow sheet illustrating one preferred embodiment of the method of this invention.

In FIG. 1, 1 denotes a pressurized column having a tightly closed upper section, 2 a bed of filtering grains and 3 a support layer for said filter bed. In the device illustrated, the filter bed 2 is formed of a single kind of filtering grains. To purify a given raw water supply by this device, the valve $V_1$ is opened and the raw water pump 4 is turned on. Consequently, the raw water is delivered in a compressed state into a trough 5 in the upper section inside the column and made to overflow said trough and flow downwardly through the filter bed 2, with the result that purified water is passed via the valve $V_2$ into a purified water line 6. In the course of this filtration, the oily matter and insoluble solids suspended in the raw water are filtered out and retained in the filter bed. After the amount of the filtration residue thus retained in the filter bed has increased to the extent of degrading the purifying capacity of the filter bed, the filter bed must be given a washing to regain its full filtering capacity. For this purpose, the conventional method comprises first giving the filter bed a backwashing with air and subsequently subjecting the filter bed to a backwashing with rinse water. To be specific, the washing water is introduced under pressure upwardly into the column via the bottom thereof by opening the valve $V_3$ and operating the backwash pump 7 so as to wash the filtration residue off the filtering grains by the upward current of water ascending through the filter bed. The spent washing water which now entrains the filtration residue is led from the trough 5 into the discharge line 8 outside the device and finally discharged via the valve $V_4$. Next, washing water is passed downwardly through the filter bed by way of final rinsing, with the spent washing water discharged through the bottom of the column and the valve $V_5$. After completion of this final rinsing operation, the filtration is started. As the washing water for the backwashing treatment and for the final rinsing treatment, it is most common to use the purified water resulting from the filtration although, rarely, raw water is used.

Now, the method of this invention will be described. This method does not involve the backwashing treatment by use of air but combines the backwashing treatment by use of water with a step of circulating the filtering grains through a looped path formed in part by the interior of the device. By this method, the filtering grains are thoroughly freed from the filter residue including mud balls and, at the same time, the time requirement for the backwashing treatment by use of water and the consumption of the washing water are both lowered. This circulation of the filtering grains is started by connecting a circulation line 10 containing a circulation pump 9 to the upper part and the lower part of the filter bed contained in the column and operating the circulation pump 9. Consequently, the water flowing up the column entrains the filtering grains and carries them out of the column from the upper end thereof. The filtering grains are then forwarded through the circulation line outside the column and brought back into the lower part of the filter bed of the column.

In the illustrated device, the line 10 which is connected to the suction side of the circulation pump has its other terminal 10' connected via a valve $V_6$ into the discharge line 8, so that the trough 5 and the line 8 serve both in the backwashing treatment and in the circulation of filtering grains. Instead of putting the trough 5 and the line 8 to such a double function, it is possible to connect the terminal 10' of the line 10 to the upper part of the column for withdrawing filtering grains directly.

In the device constructed as described above, washing of the filtering grains is accomplished as follows: The valve 6 is opened and the circulation pump 9 is operated before the backwashing treatment by use of water. Consequently, the water in the filter device circulates through the circulation line 10. In this case, the discharge quantity of the pump is fixed so that the water is moved through the column interior at a rate high enough for the current of water to entrain at least part of the filtering grains. The individual filtering grains of the filter bed, accordingly, are fluidized inside the column, gradually drawn off the top of the filter bed, passed out of the column through the line 10 and introduced back into the lower part of the filter bed. While the filtering grains are being fluidized inside the column and also while they are being moved inside the line 10 and the pump 9, they are exposed to frictional contact and turbulence so that the filtration residue adhering to the grains is scraped off. When the filtering grains are introduced back into the column, they forcefully collide into and agitate the remaining filter bed. If the filter bed happens to be retaining mud balls, these mud balls are broken up by the collision of the incoming filtering grains.

Of course, not all the filtering grains need be circulated for the purpose of washing. The circulation has only to be continued for a period (practically for several minutes) enough for the individual filtering grains to fluidize, the filtration residue to come off the grains thoroughly and the mud balls to break up. When this has been accomplished, the pump 9 is stopped and the valve 6 is closed. Then backwashing treatment with water is carried out by an ordinary method, in which the valves $V_3$ and $V_4$ are opened and the backwash pump is operated. The released and broken-up filtration residue in the filter device is drawn out by the outgoing current of the spent washing water through the discharge line 8. The treatment by the circulation described above causes the whole filtration residue including mud balls to be thoroughly broken up so as to be contained in the mass of filtering grains in the form of flock. Thus, in the course of the backwashing treatment, the filtration residue is easily entrained by the outgoing current of the backwash water. This removal of the filtration residue is accomplished within a very short span of time.

After the backwashing treatment by use of water is completed, the filter bed freshly formed inside the column is subjected to the final rinsing treatment by an ordinary known method. Then, the filter device is ready for operation.

Figure 2:
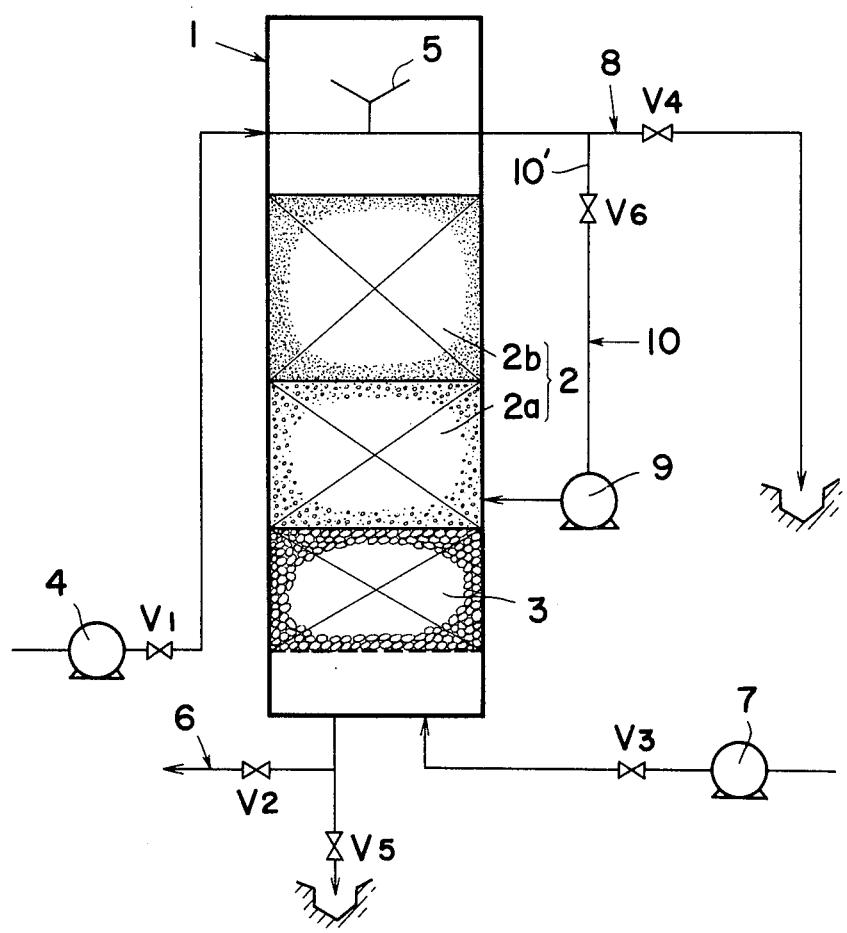
FIG. 2 is a flow sheet illustrating another preferred embodiment of this invention.

FIG. 2 depicts a filter device wherein a filter bed 2 is composed of a lower bed 2a formed of filtering grains of greater specific gravity and an upper bed 2b formed of filtering grains of a smaller specific gravity. The filtering grains which make up the lower layer 2a may be sand particles 0.4 mm to 2mm in particle diameter and 2 and 3 in specific gravity, for example. The filtering grains which form the upper layer may be grains of a synthetic resin such as, for example, acrylic, polystyrene or polyvinyl chloride resin having a particle diameter of the order of 1 to 8 mm and a specific gravity of the order of 1.1 to 1.5. In this case, the circulation pump 9 is only required to be operated so that the velocity of the water circulated upwardly in the column is high enough to circulate the filtering grains of the smaller specific gravity forming the upper layer and is not high enough to force the filtering grains of the greater specific gravity of the lower layer out of position.

When desired washing of the filter bed in the filter device of the construction of FIG. 2 is effected by operating the circulation pump so as to bring about the behavior of filtering grains as described above, in the course of the circulation treatment, the filtering grains making up the upper layer of the filter bed are fluidized inside the column and then circulated through the circulation line. While the filtering grains are being fluidized and circulated, they are exposed to frictional contact and turbulence similarly to those in the filter device of FIG. 1. Consequently, the filtration residue adhering to the grains are scraped off the grains and liberated. While the filtering grains are being introduced back into and past the lower layer of the filter bed, they cause agitation of the filtering grains of the lower layer. If mud balls happen to be retained in the lower layer, said agitation is powerful enough to break up the mud balls. In this case, the upward current of the washing water caused by the circulation pump also fluidizes the filtering grains of the lower layer of the filter bed. The filtering grains of the upper layer, in the course of the circulation, are propelled into and past those of the lower layer. During this passage through the lower layer, those of the upper layer cause vigorous disturbance of those of the lower layer, enabling the filtration residue adhering to themselves and the filtration residue adhering to those of the lower layer to be scraped off and liberated. The disturbance also contributes to further breakage of mud balls, if any, retained in the lower layer of the filter bed. By this method, the removal of filtration residue and the breakage of mud balls can be accomplished more effectively than when all the filtering grains of the filter bed are circulated. This method also enjoys the advantage that the circulation pump of a smaller capacity will suffice for the operation.

This circulation treatment can be completed within an extremely short period of time, and one to a few circulations are enough for the purpose of the washing. The circulation treatment is followed by the backwashing treatment by use of water. Now that the filtration residue and mud balls are in a state thoroughly released from the filtering grains, they are readily removed by being entrained by the current of backwashing water. Thus, the backwashing treatment is quickly brought to completion. While the circulation treatment is in progress, the filtering grains of the upper layer of the filter bed and those of the lower layer are intermingled. By the time that the backwashing treatment is brought to completion, however, they are spontaneously sorted out and arranged into the upper and lower layers by virtue of the difference in specific gravity. Then, the filter bed freshly formed is subjected to the final rinsing treatment. When this treatment is done, the filter device is ready for operation.

Also in the case of a filter bed formed of three or four layers of gradually varied specific gravity, the backwashing treatment can similarly be accomplished effectively by causing the filtering grains of one or more uppermost layers to be circulated. It is, of course, permissible to have the filtering grains of all the layers circulated similarly to the embodiment of FIG. 1.

FIG. 3 is a graph showing the time-course change of the concentration of filtration residue in the spent washing water discharged from the backwashing treatment in an operation wherein a paper plant effluent having an average SS value of 27.5 ppm was treated in a filtration column of the construction of FIG. 2 measuring 400 mm in inside diameter and 3200 mm in height and containing a filter bed comprising a lower layer 2a 600 mm in height and formed of filtering sand grains and an upper layer 2b 800 mm in height and formed of filtering grains of acrylic resin. In this graph, the horizontal axis is graduated for time of backwashing treatment (in minutes) and the vertical axis for the concentration of filtration residue (in ppm). In the graph, the solid line represents the results obtained by first carrying out the circulation treatment and subsequently the backwashing treatment in accordance with the present invention. The broken line in the diagram represents the results obtained by the conventional method when the filter bed is subjected to the backwashing treatment by use of water and not to the circulation treatment. In the latter case, the backwashing treatment by use of water could not be effected without breaking up the filtration residue adhering to the surface of filtering grains by means of backwashing by use of air. Thus, the backwashing treatment by use of water was performed after the filter bed had been backwashed for 3 minutes with air fed at a linear velocity of 48 m/hour.

In the treatments involved, the conditions were as indicated below.

(Filtration treatment)

Linear velocity of water fed for filtration — 50 m/hr
Period of water feeding — 5.5 hours
Increased pressure drop within column — 9.8 m.$H_2O$
Average SS value of water treated — 3.1 ppm (Circulation treatment)

Period of circulation (enough for the whole mass of acrylic resin filtering grains to be circulated about four to five times) — 2 min.
Linear velocity of water in circulation — 80 m/hr (Backwashing treatment)

Linear velocity of washing water — 60 m/hr
Period of backwashing — 3 min.

It is evident from the graph that in the backwashing treatment, the spent washing water began to emanate from the column about 10 seconds after the start of backwashing. In the case of the method of the present invention, the filter bed was subjected first to the circulation treatment and subsequently to the backwashing treatment. In the first part of the water discharged from the backwashing treatment, the concentration of filtration residue was already fairly high (about 2500 ppm). In the water discharged during the period of 45 seconds following the start of the backwashing treatment, the concentration of filtration residue increased sharply to reach the peak (about 8000 ppm). After this period, the concentration fell sharply. After lapse of 3 minutes after the start of this treatment, the concentration of filtration residue in the water discharged was nearly nil (0 ppm). Thus at this point, the backwashing treatment could be terminated. The total amount of the filtration residue entrained by the spent water discharged from the backwashing treatment was roughly equal to that of the filtration residue strained out and retained within the filter bed in the course of the filtration treatment, indicating that the efficiency of washing was nearly 100%. As the water for the backwashing treatment, the water obtained in consequence of the filtration treatment was used. The amount of this water used in the backwashing treatment was about 1.1% of the total amount of water obtained by the filtration treatment.

In short, when the filter bed in the filter device is subjected first to the circulation treatment and subsequently to the backwashing treatment according to the present invention, the major part of the filtration residue retained in the filter bed can be released within the period of about one minute after the start of the treatment, so that the backwashing treatment can be completed in an extremely short period of time. In contrast, when the filter bed retaining the filtration residue was subjected to the backwashing by use of air and then to the backwashing treatment by use of water without the circulation treatment in accordance with the conventional method, the concentration of the filtration residue in the first part of spent water discharged from the backwashing treatment was fairly low (2250 to 2280 ppm). Even three minutes after the start of the treatment, the concentration was still as high as about 320 ppm. After this point, the decline of the concentration was very gradual. It was 13 minutes after the start of the treatment before the concentration fell to 0 ppm. The ratio of the amount of water used for the backwashing treatment to the amount of purified water obtained in the filtration treatment was about 4.7%. The fact that the conventional method has to use, for the purpose of the backwashing treatment, as much as 4.7% of the amount of purified water obtained in the filtration treatment and it has to subject the filter bed first to the backwashing treatment by use of air in advance to ensure effective backwashing with water clearly shows the advantageous effect of the present invention.

Although the filtration device has been described as a pressurized type having the upper end of a column tightly closed. Even with the filtration device of gravitational type having the upper end of a column opened into the atmosphere, the present invention can be effectively carried out.

Obviously numerous modifications and variations of the present invention are possible in light of the above teachings. It is therefore to be understood that within the scope of the appended claims, the invention may be practiced otherwise than as specifically described herein.

What is claimed is:

1. In a process for the washing of a filter bed composed of an upper layer formed of filtering grains of synthetic resin and a lower layer formed of filtering grains of sand which layers retain insoluble matter therein in a filter device for causing a downward current of raw water to flow through the filter bed, the improvement which comprises:
   (1) a first step of causing a current of washing water to flow upward from the lower portion of the filter bed at a velocity high enough for the current of water to entrain at least part of the filtering grains, then allowing the current of water entraining filtering grains to flow out of the filter device from the upper portion thereof, subsequently forwarding the discharged current of water in conjunction with the entrained filtering grains to the filter bed and repeating the circulation of the filtering grains for thereby stirring the filtering grains and freeing the filtering grains of the insoluble matter retained therein,
   (2) a second step of passing a current of rinsing water from the lower portion of the filter bed to the upper portion of the same at a velocity not high enough for the current of water to entrain the filtering grains out of the filter device for thereby giving the filter bed a backwashing treatment for removing the insoluble matter and
   (3) a third step of ceasing the backwashing treatment for thereby rearranging the upper and lower layers of the filter bed by the specific gravity difference therebetween.

2. The process according to claim 1, wherein the discharged current of water entraining the filtering grains is forwarded to the lower portion of the filter bed.

3. The process according to claim 1, wherein the lower layer is formed of sand grains having a specific gravity of 2 to 3 and a particle diameter of 0.4 to 2.0 mm and the upper layer is formed of synthetic resin grains having a specific gravity of 1.1 to 1.5 and a particle diameter of 1 to 8 mm.

4. In process for the washing of a filter bed composed of an upper layer formed of filtering grains of synthetic resin and a lower layer formed of filtering grains of sand which layers retain insoluble matter therein in a filter device for causing a downward current of raw water to flow through the filter bed, the improvement which comprises:
   (1) a first step of causing a current of washing water to flow upward from the lower portion of the filter bed at a velocity high enough for the current of water to entrain the filtering grains of the upper layer only and not high enough for the current of water to discharge the filtering grains of the lower layer out of the filter device, then allowing the current of water entraining the filtering grains of the upper layer only to flow out of the filter device from the upper portion thereof, subsequently forwarding the discharged current of water in conjunction with the entrained filtering grains of the upper layer to the filter bed and repeating the circulation of the filtering grains for thereby stirring the filtering grains and freeing the filtering grains of the insoluble matter retained therein,
   (2) a second step of passing a current of rinsing water from the lower portion of the filter bed to the upper portion of the same at a velocity not high enough for the current of water to entrain the filtering grains out of the filter device for thereby giving the filter bed a backwashing treatment for removing the insoluble matter and
   (3) a third step of ceasing the backwashing treatment for thereby rearranging the upper and lower layers of the filter bed by the specific gravity difference therebetween.

5. The process according to calim 4, wherein the discharged current of water entraining the filtering grains is forwarded to the lower portion of the filter bed.

6. The process according to claim 4, wherein the lower layer is formed of sand grains having a specific gravity of 2 to 3 and a particle diameter of 0.4 to 2.0 mm and the upper layer is formed of synthetic resin grains having a specific gravity of 1.1 to 1.5 and a particle diameter of 1 to 8 mm.

* * * * *